United States Patent
Chimbili et al.

(10) Patent No.: US 9,154,995 B2
(45) Date of Patent: Oct. 6, 2015

(54) APPARATUS AND METHOD TO REDUCE DENIAL OF SERVICE DURING MME OVERLOAD AND SHUTDOWN CONDITIONS

(71) Applicant: Broadcom Corporation, Irvine, CA (US)

(72) Inventors: Lokesh Chimbili, Bangalore (IN); Pradeep Seshadri, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/282,889

(22) Filed: May 20, 2014

(65) Prior Publication Data

US 2014/0347990 A1 Nov. 27, 2014

Related U.S. Application Data

(60) Provisional application No. 61/825,941, filed on May 21, 2013.

(51) Int. Cl.
| | |
|---|---|
| *H04J 1/16* | (2006.01) |
| *H04W 28/08* | (2009.01) |
| *H04W 76/00* | (2009.01) |

(52) U.S. Cl.
CPC ............ *H04W 28/08* (2013.01); *H04W 76/00* (2013.01)

(58) Field of Classification Search
CPC . H04L 47/10; H04L 2012/5631; H04L 47/15; H04L 47/2441; H04L 47/70; H04L 12/5602; H04L 47/27; H04L 2012/5635; H04L 47/30; H04L 47/11; H04L 47/12

USPC .............. 370/230, 349, 231, 229, 235, 310.2, 370/328, 338
See application file for complete search history.

(56) References Cited

U.S. PATENT DOCUMENTS

| | | | |
|---|---|---|---|
| 8,000,705 B2* | 8/2011 | Kim et al. ................... | 455/435.1 |
| 8,228,852 B2* | 7/2012 | Yi et al. ......................... | 370/329 |
| 8,504,055 B2* | 8/2013 | Vikberg et al. ............... | 455/453 |
| 2011/0105140 A1* | 5/2011 | Cheon et al. .................. | 455/453 |
| 2011/0199898 A1* | 8/2011 | Cho et al. ..................... | 370/230 |
| 2012/0069737 A1* | 3/2012 | Vikberg et al. ............... | 370/232 |
| 2012/0088495 A1* | 4/2012 | Tsai ............................ | 455/422.1 |
| 2012/0178436 A1* | 7/2012 | Fan ............................ | 455/422.1 |
| 2012/0178495 A1* | 7/2012 | Tohzaka et al. ............... | 455/524 |
| 2012/0236707 A1* | 9/2012 | Larsson et al. ................ | 370/217 |
| 2012/0302196 A1* | 11/2012 | Chin et al. .................. | 455/404.1 |
| 2013/0137438 A1* | 5/2013 | Serravalle et al. ............. | 455/437 |
| 2013/0324141 A1* | 12/2013 | Jung et al. ..................... | 455/450 |

* cited by examiner

*Primary Examiner* — Brenda H Pham
(74) *Attorney, Agent, or Firm* — Sterne, Kessler, Goldstein & Fox PLLC

(57) ABSTRACT

A communication device configured to perform a load balancing procedure in response to a mobility management entity being overloaded and/or shut down. The base station can be configured to generate a radio resource control (RRC) Connection Reject message including a load balancing clause. The communication device can be configured to initiate a load balancing procedure based on the RRC Connection Reject message. The communication device can also be considered to initiate a load balancing procedure after a predetermined wait time has expired and/or after a predetermined number of received RRC Connection Reject messages.

20 Claims, 9 Drawing Sheets

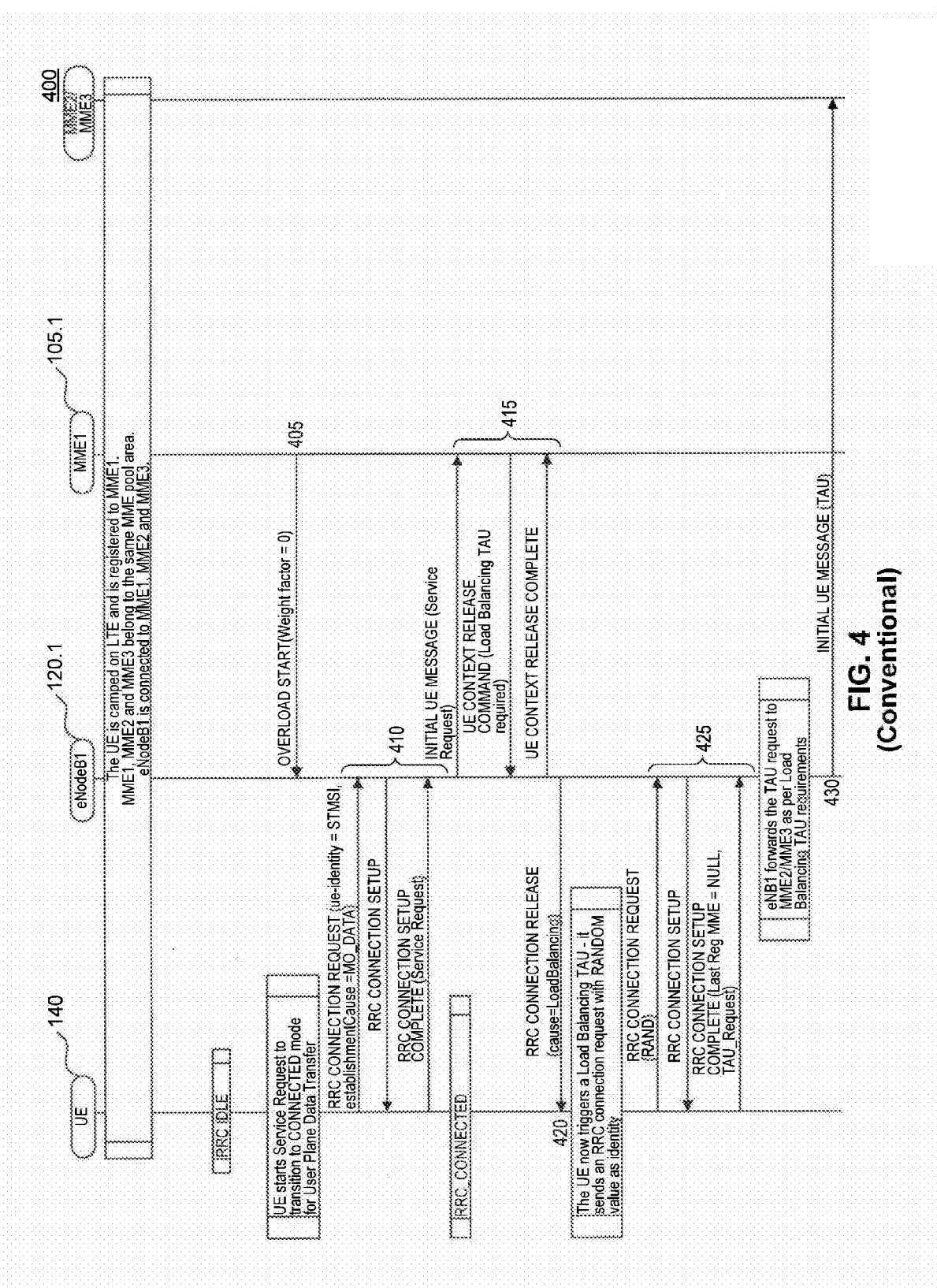
FIG. 4
(Conventional)

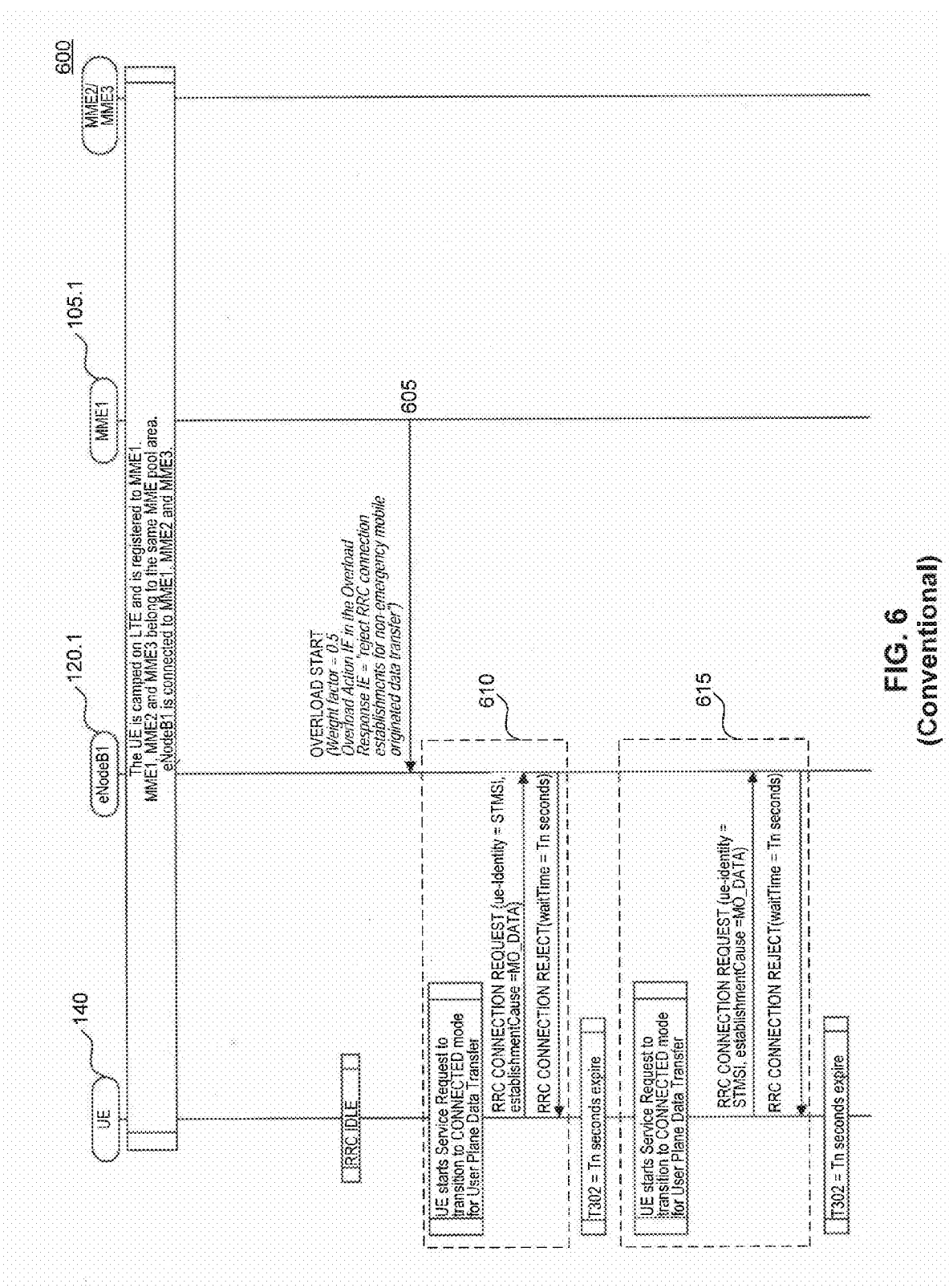
FIG. 6
(Conventional)

APPARATUS AND METHOD TO REDUCE DENIAL OF SERVICE DURING MME OVERLOAD AND SHUTDOWN CONDITIONS

CROSS REFERENCE TO RELATED APPLICATIONS

This patent application claims the benefit of U.S. Provisional Patent Application No. 61/825,941, filed May 21, 2013, entitled "Algorithm For Signaling Optimization And Avoiding Denial Of Service During MME Overload And Shutdown conditions," which is incorporated herein by reference in its entirety.

BACKGROUND

Field

This application relates generally to wireless communications, including addressing denial of service during mobility management entity (MME) overload and/or shutdown conditions.

BRIEF DESCRIPTION OF THE DRAWINGS/FIGURES

The accompanying drawings, which are incorporated herein and form a part of the specification, illustrate the embodiments of the present disclosure and, together with the description, farther serve to explain the principles of the embodiments and to enable a person skilled in the pertinent art to make and use the embodiments.

FIG. 4 illustrates a flowchart of a conventional load balancing procedure,

FIG. 6 illustrates a flowchart of a conventional load balancing procedure.

The embodiments of the present disclosure will be described with reference to the accompanying drawings. The drawing in which an element first appears is typically indicated by the leftmost digit(s) in the corresponding reference number.

DETAILED DESCRIPTION

Figure 1:
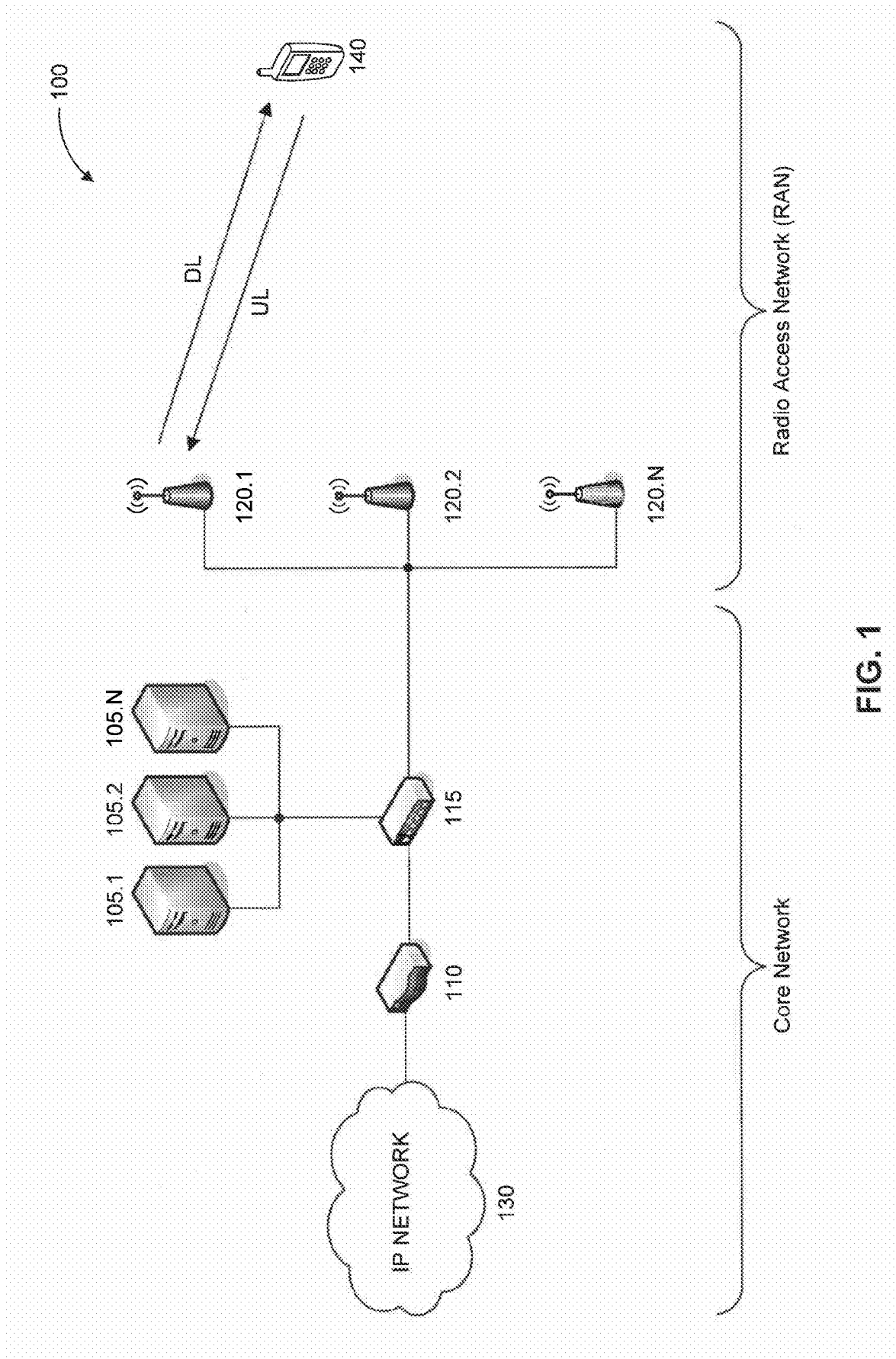
FIG. 1 illustrates an example network environment.

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

In the following disclosure, terms defined by the Long-Term Evolution (LTE) standard are sometimes used. For example, the term "eNodeB" or "eNB" is used to refer to what is commonly described as a base station (BS) or a base transceiver station (BTS) in other standards. The term "User Equipment (UE)" is used to refer to what is commonly described as a mobile station (MS) or mobile terminal in other standards. The LTE standard is developed by the 3rd Generation Partnership Project (3GPP) and described in the 3GPP specifications and International Mobile Telecomunnications-2000 (IMT-2000) standard, all of which are incorporated by reference in their entirety. Further, 3GPP refers to a communication network as a UTRAN (Universal Mobile Telecommunication System (UMTS) Terrestrial Radio Access Network, a E-UTRAN (Evolved UTRAN), and/or a GERAN (Global System for Mobile Communications (GSM) Enhanced Data rates for GSM Evolution (EDGE) Radio Access Network) to provide some examples. The 3GPP LTE specifications include the European Telecommunications Standard Institute (ETSI) Technical Specification (TS) 136 Series, referred hereinafter as "3GPP TS 36 Series," each of which is incorporated herein by reference in its entirety.

Although exemplary embodiments are described with reference to LTE, the more generic terms "mobile device" and "base station" are used herein except where otherwise noted to refer to the LTE terms "User Equipment (UE)" and "eNodeB/eNB," respectively. Further, the embodiments are not limited to implementation in LTE, as other communication standards could be used, as will be understood by those skilled in the arts.

As will be apparent to one of ordinary skill in the relevant art(s) based on the teachings herein, exemplary embodiments are not limited to the LTE standard, and can be applied to other cellular communication standards, including (but not limited to) Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), and Worldwide Interoperability for Microwave Access (WiMAX) (IEEE 802.16) to provide some examples. Further, exemplary embodiments are not limited to cellular, communication networks and can be used or implemented in other kinds of wireless communication access networks, including (but not limited to) Wireless Local Area Network(s) (WLAN) (IEEE 802.11), Bluetooth (IEEE 802.15.1 and Bluetooth Special Interest Group (SIG)), Near-field Communication (NFC) (ISO/IEC 18092), ZigBee (IEEE 802.15.4), Radio-frequency identification (RFID), and/or infrared communication, to provide some examples. These various standards and/or protocols are each incorporated by reference in their entirety.

For the purposes of this discussion, the term "processor circuitry" shall be understood to be one or more: circuit(s), processor(s), or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal and/or external memory to retrieve instructions stored in the memory, which when executed by the processor, perform the corresponding function(s) associated with the processor.

FIG. 1 illustrates an example communication environment 100 that includes a radio access network (RAN) and a core network. The RAN includes one or more base stations 120.1 to 120.N and one or more mobile devices 140. The core network includes one or more mobility management entities (MMEs) 105.1 to 105N communicatively coupled to the base stations 120 via switch 115. The switch 115 communicatively couples the MMEs 105 and base stations 120 to an internet protocol (IP) backhaul network 130 via a gateway 110. In exemplary embodiments, the MMEs 105 can be collectively referred to as the "pool of MMEs."

The number of base stations 120, mobile devices 140, MMEs 105, switches 115, gateways 110 and/or IP networks 130 are not limited to the exemplary quantities illustrated in FIG. 1, and the communication environment 100 can include any number of the various components as would be understood by one of ordinary skill in the relevant art(s) without departing from the spirit and scope of the present disclosure. Further, one of ordinary skill in the relevant art(s) will understand that any combination of the MME's can be communicatively coupled to any combination of the base stations 120 without departing from the spirit and scope of the present disclosure. For example, each of the MMEs 105.1 to 105.N can be communicatively coupled to each of the base stations 120A to 120.N.

In exemplary embodiments, the MMEs 105 are communicatively coupled to the base stations 120 via an S1-MME interface, to the gateway 110 via an S11 interface, and to each other via an S10 interface. The gateway is communicatively coupled to the switch 115 via an S11 interface and to the IP network 130 via an S5/S8 interface. The various interfaces are discussed in more detail in the 3GPP TS 36 Series specifications.

The base station(s) 120 and mobile device(s) 140 each include one or more processors, circuitry, and/or logic that is configured to communicate via one or more wireless and/or wired technologies. The MMEs 105, switch 115, and gateway 110 each include one or more processors, circuitry, and/or logic that is configured to communicate via one or more well-known wired technologies. The one or more processors can include (and be configured to access) one or more internal and/or external memories that store instructions and/or code that, when executed by the processor(s), cause the processor(s) to perform one or more operations to facilitate communications via one or more wireless and/or wired technologies as discussed herein. Further, one or more of the mobile devices 140 can be configured to support co-existing wireless communications.

The mobile device(s) 140 can include, for example, a transceiver having one or more processors, circuitry, and/or logic that is configured to transmit and/or receive wireless communications via one or more wireless technologies within the communication environment 100. The base station(s) 120 include one or more processors, circuitry, and/or logic that is configured to: (1) receive one or more wired communications via one or more well-known wired technologies (e.g., within the core backhaul network) and transmit one or more corresponding wireless communications via one or more wireless technologies within the communication environment 100, (2) receive one or more wireless communications within the communication environment 100 via one or more wireless technologies and transmit one or more corresponding wired communications via one or more well-known wired technologies within the core network, and (3) to transmit and/or receive wireless communications via one or more wireless technologies within the communication environment 100. The wireless technologies can include, for example, one or more wireless protocols discussed above. The number of mobile devices 140 and/or base stations 120 are not limited to the numbers shown in the exemplary embodiment illustrated in FIG. 1, and the communication environment 100 can include any number of mobile devices 140 and/or base stations 120 as would be understood by those skilled in the relevant arts without departing from the spirit and scope of the present disclosure.

The mobile device 140 can be configured to communicate with one or more of the base stations 120 in the communication environment 100. For example, the mobile device 140 receives signals on one or more downlink (DL) channels and transmits signals to the base station 120.1 on one or more respective uplink (UL) channels. The mobile device 140 can also be configured to communication with one or more other mobile devices 140 utilizing one or more device-to-device communication connections (e.g., using Bluetooth, Wi-Fi, etc.).

Examples of the mobile device(s) 140 include (but are not limited to) a mobile computing device—such as a laptop computer, a tablet computer, a mobile telephone or smartphone, a "phablet," a personal digital assistant (PDA), and mobile media player; and a wearable computing device—such as a computerized wrist watch or "smart" watch, and computerized eyeglasses. In some embodiments, the mobile device 140 may be a stationary device, including, for example, a stationary computing device—such as a personal computer (PC), a desktop computer, a computerized kiosk, and an automotive/aeronautical/maritime in-dash computer terminal.

In an exemplary embodiment, the base stations 120 include one or more processors, circuitry, and/or logic that are configured for communications conforming to 3GPP's Long-Term Evolution (LTE) specification (e.g., the base stations are LTE base stations), and the mobile device 140 includes one or more processors, circuitry, and/or logic that is configured for communications conforming to 3GPP's LTE specification. The one or more processors, circuitry, and/or logic of the mobile device 140 can be further configured for communications conforming to one or more other 3GPP and/or non-3GPP protocols via one or more device-to-device communication networks established with one or more other mobile devices. In this example, the communication network 100 is an LTE communication network. In an exemplary embodiment, the communication of the mobile device 140 with one or more other mobile devices 140 can be a device-to-device communication that bypasses the base stations 120.

Those skilled in the relevant art(s) will understand that the base station(s) 120 and the mobile device(s) 140 are not limited to the exemplary 3GPP and non-3GPP wireless protocols discussed herein, and the base station(s) 120 and/or the mobile device(s) 140 can be configured for wireless communications conforming to one or more other 3GPP and/or non-3GPP wireless protocols in addition to, or in the alternative to, the wireless protocols discussed herein.

The switch 115 includes one or more processors, circuitry, and/or logic that is configured to route data between the various components of the core network and/or RAN. For example, the switch 115 can be configured to route data between one or more of the MMEs 105 and one or more base stations 120.

The gateway 110 includes one or more processors, circuitry, and/or logic that is configured to route data between the various components of the core network and/or RAN. The gateway 110 can be configured as a mobility anchor for the user plane during inter-base station 120 handovers and as an anchor for mobility between LTE and other 3GPP technologies. For idle state mobile devices 140, the gateway 110 can be configured to terminate the downlink data path and trigger paging when downlink data arrives for the mobile device 140.

The IP network 130 includes one or more devices and/or components configured to exchange data with one or more other devices and/or components via one or more wired and/or wireless communications protocols. In exemplary embodiments, the base stations 120 communicate with one or more service providers via the IP network 130.

The mobility management entities (MMEs) 105 each provide LTE network access control, and include one or more processors, circuitry, and/or logic that is configured to process UE location information and/or UE movement and speed information, and perform idle mode paging and tagging procedures and/or authentication procedures of one or more mobile devices 140 by interacting with one or more home subscriber servers (HSS). For authentication purposes, the MME 105 can be configured to verify the authorization of a mobile device 140 to camp on a service provider's Public Land Mobile Network (PLMN) and enforces roaming restrictions of the mobile devices 140. The MMEs 105 can also be configured to perform one or more bearer activation/deactivation procedures and/or to select a serving gateway (SGW) (e.g., gateway 110) for a mobile device's 140 initial attachment to the communication environment 100 and at times of intra-LTE handover operations involving core network node relocations. In operation, the mobile devices 140 register with one of the MMEs 105 within the pool of MMEs 105. During maintenance of an MME, overloading of the MME, and/or any other operation as would be understood by those skilled in the relevant arts, an MME can be configured to shut down and/or restrict connections from registered mobile devices 140. In these examples, registered mobile device(s) 140 seeking an active connection to the communication environment 100 can perform a load balancing procedure that registers the mobile device(s) 140 with another MME of the pool of MMEs 105. Here, the base station 120 communicating with the mobile device(s) 140 can select the other MME for registration.

Figure 2:
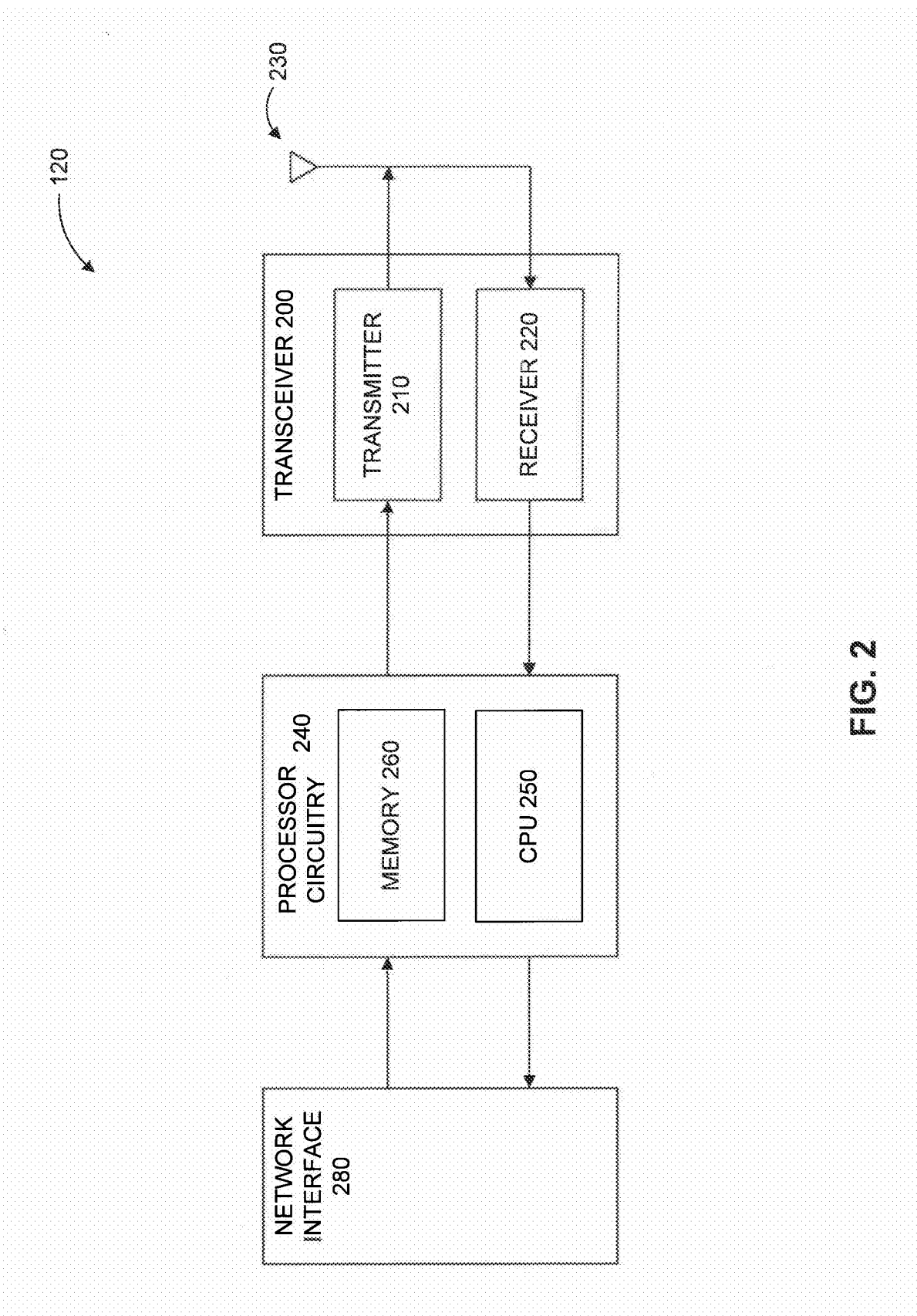
FIG. 2 illustrates a base station according to an exemplary embodiment of the present disclosure.

FIG. 2 illustrates the base station 120 according to an exemplary embodiment of the present disclosure. For example, the base station 120 can include a transceiver 200 and a network interface 280, each communicatively coupled to processor circuitry 240.

The transceiver 200 includes one or more processors, circuitry, and/or logic that is configured to transmit and/or receive wireless communications via one or more wireless technologies within the communication environment 100. In particular, the transceiver 200 can include a transmitter 210 and a receiver 220 that have one or more processors, circuitry, and/or logic configured to transmit and receive wireless communications, respectively, via one or more antennas 230. Those skilled in the relevant art(s) will recognize that the transceiver 200 can also include (but is not limited to) a digital signal processor (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will recognize that the antenna 230 may include an integer array of antennas, and that the antenna 230 may be capable of both transmitting and receiving wireless communication signals. For example, the base station 120 can be configured for wireless communication utilizing a. Multiple-input Multiple-output (MIMO) configuration.

In an exemplary embodiment, the transceiver 200 is configured for wireless communications conforming to one or more wireless protocols defined by 3GPP. For example, the transceiver 200 is configured for wireless communications conforming to 3GPP's LTE specification. In this example, the transceiver 200 can be referred to as LTE transceiver 200. Those skilled in the relevant art(s) will understand that the transceiver 200 is not limited to communication conforming to 3GPP's LTE specification, and can be configured for communications that conform to one or more other 3GPP protocols and/or one or more non-3GPP protocols. It should be appreciated that the transceiver 200 can be referred to by one or more other 3GPP and/or non-3GPP protocols in embodiments where the transceiver 200 is configured for such other communications conforming to the other 3GPP and/or non-3GPP protocols.

The network interface 280 includes one or more processors, circuitry, and/or logic that is configured to transmit and/or receive communications via one or more wired technologies to/from one or more components of the core network (e.g., switch 115). Those skilled in the relevant art(s) will recognize that the network interface 280 can also include (but is not limited to) a digital signal processor (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will understand that the network interface 280 is not limited to wired communication technologies and can be configured for communications that conform to one or more well-known wireless technologies in addition to, or alternatively to, one or more well-known wired technologies.

The processor circuitry 240 can include one or more processors (CPUs) 250 and/or circuits configured to carry out instructions to perform arithmetical, logical, and/or input/output (I/O) operations of the base station 120 and/or one or more components of the base station 120. The processor circuitry 240 can further include a memory 260 that stores data and/or instructions, where when the instructions are executed by the processor(s) 250, perform the functions described herein. The memory 260 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 260 can be non-removable, removable, or a combination of both.

Figure 3:
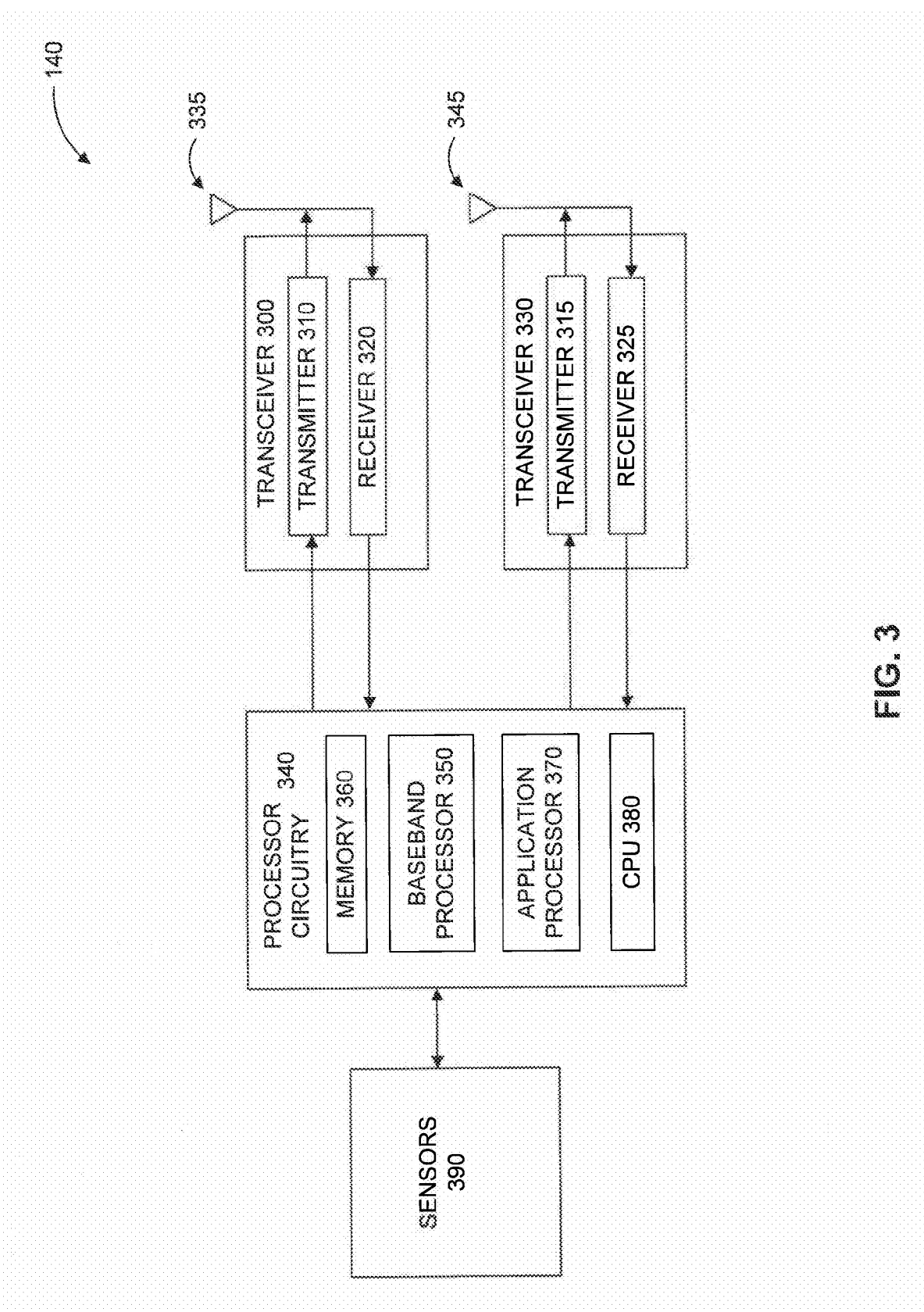
FIG. 3 illustrates a mobile device according to an exemplary embodiment of the present disclosure.

FIG. 3 illustrates the mobile device 140 according to an exemplary embodiment of the present disclosure. The mobile device 140 can include processor circuitry 340 communicatively coupled to one or more transceivers configured to communicate with one or more 3GPP and/or non-3GPP communication protocols. That is, the mobile device 140 can be configured for wireless communications conforming to one or more wireless protocols defined by 3GPP and/or one or more non-3GPP wireless protocols. In an exemplary embodiment, the mobile device 140 includes an LTE transceiver 300 and a WLAN transceiver 330. In this example, the mobile device 140 is configured for wireless communication conforming to 3GPP's LTE specification and for wireless communication conforming to IEEE's 802.11 WLAN specification. Those skilled in the relevant art(s) will understand that the mobile device 140 is not limited to these exemplary 3GPP and non-3GPP wireless protocols, and the mobile device 140 can be configured for wireless communications conforming to one or more other 3GPP and/or non-3GPP wireless protocols in addition to, or in the alternative to, the wireless protocols discussed herein, and/or to a subset of the LTE and WLAN specifications discussed above.

The LTE transceiver 300 includes one or more processors, circuitry, and/or logic that is configured for transmitting and/or receiving wireless communications conforming to 3GPP's LTE specification. In particular, the LTE transceiver 300 can include an LTE transmitter 310 and an LTE receiver 320 that have one or more processors, circuitry, and/or logic configured for transmitting and receiving wireless communications conforming to 3GPP's LTE specification, respectively, via one or more antennas 335. Transceiver 300 need not be limited to LTE, and could operate according to one or more other 3GPP and/or non-3GPP protocols, as will be understood by those skilled in art.

The WLAN transceiver 330 includes one or more processors, circuitry, and/or logic that is configured for transmitting and/or receiving wireless communications conforming to IEEE's 802.11 WLAN specification. In particular, the WLAN transceiver 330 can include a WLAN transmitter 315 and a WLAN receiver 325 that have one or more processors, circuitry, and/or logic configured for transmitting and receiving wireless communications conforming to IEEE's 802.11 WLAN specification, respectively, via one or more antennas 345. Transceiver 330 need not be limited to WLAN, and could operate according to one or more other 3GPP and/or non-3GPP protocols, as will be understood by those skilled in art.

In exemplary embodiments, the LTE transceiver 300 and the WLAN transceiver 330 can include (but are not limited to) a digital signal processor (DSP), modulator and/or demodulator, a digital-to-analog converter (DAC) and/or an analog-to-digital converter (ADC), and/or a frequency converter (including mixers, local oscillators, and filters) that can be utilized in transmitting and/or receiving of wireless communications. Further, those skilled in the relevant art(s) will recognize that antennas 335 and/or 345 may include an integer array of antennas, and that the antennas may be capable of both transmitting and receiving wireless communication signals. It will also be understood by those skilled in the relevant art(s) that any combination of the LTE transceiver 300 and WLAN transceiver 330, as well as one or more other transceivers, circuits, and/or processors may be embodied in a single chip and/or die.

The processor circuitry 340 includes one or more processors, circuitry, and/or logic that is configured to control the overall operation of the mobile device 140, including the operation of the LTE transceiver 300 and WLAN transceiver 330. The one or more processors can include one or more baseband processors 350, one or more application processors 370, and/or one or more other processors (CPUs) 380. As would be understood by those skilled in the relevant arts, any combination of the baseband processor(s) 350, application processor(s) 370 and/or processor(s) 380 may be embodied as a single chip and/or die.

The processor circuitry 340 can further include a memory 360 that stores data and/or instructions, where when the instructions are executed by the processor(s) 350, baseband processor(s) 370, and/or application processor(s) 380, perform the functions described herein. Similarly, the memory 360 can be any well-known volatile and/or non-volatile memory, and can be non-removable, removable, or a combination of both.

The baseband processor(s) 350 can be configured to control the operation of the LTE transceiver 300 and/or WLAN transceiver 330, including transmitting and/or receiving of wireless communications via the LTE transceiver 300 and/or WLAN transceiver 330, and/or perform one or more baseband processing functions, including (but not limited to), for example, media access control (MAC), encoding/decoding, modulation/demodulation, data symbol mapping, error correction, and the like.

The application processor(s) 370 can be configured to carry out instructions to perform arithmetical, logical, and/or input/output (I/O) operations of the mobile device 140 and/or of one or more components of the mobile device 140. For example, the application processor(s) 370 can be configured to carry out internally-stored instructions and/or instructions stored in memory 360, including the running of one or more applications and/or operating systems, including user applications.

The processor(s) 380 can be configured to control the operation of the mobile device 140, including carrying out one or more instructions to perform one or more functions described herein.

In an exemplary embodiment, the mobile device 140 includes one or more other transceivers (not shown) configured to communicate via one or more 3GPP protocols, one or more non-3GPP protocols, and/or one or more other well-known communication technologies. In an exemplary embodiment, the one or more other transceivers can be configured for navigational purposes utilizing one or more well-known navigational systems, including the Global Navigation Satellite System (GLASS), the Russian Global Navigation Satellite System (GLONASS), the European Union Galileo positioning system (GALILEO), the Japanese Quasi-Zenith Satellite System (QZSS), the Chinese BeiDou navigation system, and/or the Indian Regional Navigational Satellite System (IRNSS) to provide some examples. Further, the mobile device 140 can include one or more positional and/or movement sensors 390 (e.g., GPS, accelerometer, gyroscope sensor, etc.) implemented in (and/or in communication with) the mobile device 140. Here, the location and/or movement of the mobile device 140 can be determined using one or more transceivers configured for navigation purposes, one or more of the positional and/or movement sensors 390, and/or one or more positional determinations using signal characteristics relative to one or more base stations and/or access points.

As set forth in one or more of the 3GPP TS 36 Series specifications, LTE downlink and uplink transmissions are organized into radio frames each having a duration of 10 milliseconds (ms). Here, a radio frame consists of 10 subframes, each subframe consisting of two consecutive 0.5 ms slots. Each slot comprises six OFDM symbols for an extended cyclic prefix and seven OFDM symbols for a normal cyclic prefix. In both the uplink and downlink, data is time and frequency multiplexed by mapping OFDM symbols to a time/frequency resource grid consisting of elementary units called resource elements (REs) that are uniquely identified by the antenna port, sub-carrier position, and OFDM symbol index within a radio frame. A group of resource elements corresponding to twelve consecutive subcarriers within a single time slot is referred to as a resource block (RB).

In exemplary embodiments, and as explained in detail below, the mobile device 140 (e.g., UE) is registered with an MME 105 (e.g., MME 105.1). In operation, the registered MME 105.1 can be configured to enter a shutdown state, or may become overloaded with excess traffic and/or overloaded with the number of mobile devices seeking service from, and/or being serviced by, the MME 105.1. In these examples, the mobile device 140 can be configured to initiate a load balancing procedure to register with one of the other MMEs 105.2 to 105N. Further, in cases where an MME 105 anticipates and/or enters an overload state, the MME 105 can restrict connection attempts from mobile devices 140 to those mobile devices 140 attempting to connect for one or more predetermined operations. For example, in anticipation of or while in an overload state, the MME 105 can restrict connections to only those mobile devices 140 attempting to register to establish an emergency call. In these examples, the mobile device 140 can be configured to initiate a load balancing procedure to register with one of the other MMEs 105.2 to 105.N.

For the purposes of this discussion, the mobile device 140 is registered with, for example, MME 105.1 of the pool of MMEs 105.1 to 105.N and is camped on the LTE network provided by base station 120.1. However, the mobile device-MME-base station associations are not limited to these example relationships, and the mobile device 140 can be camped on an LTE network provided by any of the base stations 120 and be registered with any of the MMEs 105 as would be understood by those skilled in the relevant arts.

FIG. 4 illustrates a flowchart 400 of a conventional load balancing method. The method of flowchart 400 is described with continued reference to one or more of FIGS. 1-3. The steps of the method of flowchart 400 are not limited to the order described below, and the various steps may be performed in a different order. Further, two or more steps of the method of flowchart 400 may be performed simultaneously with each other.

The method of flowchart 400 starts off assuming that a mobile device (e.g. UE) is camped, in an idle state, on an LTE network and is currently registered to MME1 of a pool of MMEs 1-3, which are served by the same eNobdeB (base station), namely eNodeB1. The method of flowchart 400 begins at step 405, where MME 105.1 of the pool of MMEs 105.1 to 105.N generates an overload start message and provides the overload start message to one or more of the base stations 120. For example, the MME 105.1 can send the message to each of the base stations 120. For the purposes of this discussion, the flowchart 400 will be described with reference to the base station's 120.1 receipt of the overload start message and the mobile device's 140 registration with MME 105.1.

In operation, the MME 105.1 issues the overload start message in response to a request from, for example, a service provider associated with the MME 105.1 indicating that the MME 105.1 is to be shut down for maintenance, overloading, and/or any other reason as would be understood by those skilled in the relevant arts. The overload start message can be provided to each of the base stations 120 that are associated with the MME 105.1. The overload start message can include a weight factor having a value of, for example, zero. In operation, the mobile devices 140 register with an MME from a pool of MMEs based on the weight factor. With a weight factor of zero, mobile devices 140 will not register with the MME 105.1.

After step 405, the method of flowchart 400 transitions to step 410, where the mobile device 140 initiates a transition from an idle mode to a connected mode. In operation, the mobile device 140 generates a radio resource control (RRC) connection request and provides the RRC connection request to the base station 120.1, in order to initiate the transition from idle to connected mode. The RRC connection request includes an SAE temporary mobile subscriber identity (STMSI) and an establishment cause. The STMSI includes information used by the base station 120.1 to identify that the mobile device 140 is registered with MME 105.1. In response to the RRC connection request, the base station 120.1 generates and provides an RRC connection setup message to the mobile device 140. The RRC connection setup message informs the mobile device 140 that it now has an active connection and the mobile device 140 is operating in a connected mode. The mobile device 140 is configured to generate and provide an RRC connection setup complete message to the base station 120.1 to acknowledge the RRC connection setup message. The RRC connection setup complete message can include a service request clause, which is forwarded to the MME 105.1 by the base station 120.1 as described in more detail in step 415.

After step 410, the method of flowchart 400 transitions to step 415, where the base station 120.1 forwards the service request clause received from the mobile device 140 to the MME 105.1. In response to the service request clause, the MME 105.1 generates and provides a UE Context Release command to the base station 120.1. The UE Context Release command includes a Load Balancing Tracking Area Update (TAU) required clause, which indicates to the base station 120.1 that the MME 105.1 is not accepting new connections by a mobile device 140. The base station 120.1 is configured to generate and provide a UE Context Release Complete message to the MME 105.1 to acknowledge receipt of the UE Context Release command.

After step 415, the method of flowchart 400 transitions to step 420, where the base station 120.1 generates and provides an RRC Connection Release message to the mobile device 140. The RRC Connection Release message can include a Load Balancing Clause that instructs the mobile device 140 that the MME 105.1 (to which it is currently registered) is unavailable and that a load balancing procedure should be performed by the mobile device. At this point, the mobile device 140 transitions from the connected mode back to the idle mode.

After step 420, the method of flowchart 400 transitions to step 425, where the mobile device 140 initiates transition from the idle mode to the connected mode by performing a load balancing procedure. In operation, the mobile device 140 generates an RRC connection request and provides the RRC connection request to the base station 120.1. Here, the RRC connection request includes a random number as an identifier. The random number can be a value from, for example, zero to $2^{40}$. In response to the RRC connection request, the base station 120.1 generates and provides an RRC connection setup message to the mobile device 140. The RRC connection setup message informs the mobile device 140 that it now has an active connection and the mobile device 140 is operating in a connected mode. The mobile device 140 is configured to generate and provide an RRC connection setup complete message to the base station 120.1 to acknowledge the RRC connection setup message. Here, the RRC connection setup complete message includes a null value for the last registered MME (e.g., Last Reg MME=null) and a Tracking Area Update (TAU) request (e.g., TAU_Request). The TAU request includes location, movement, and/or speed information of the mobile device 140. This information can be provided to the one or more of the MMEs 105 and utilized by the one or more MMEs 105 in, for example, idle mode paging and tagging procedures.

After step 425, the method of flowchart 400 transitions to step 430, where the base station 120.1 receives the RRC connection setup complete message from the mobile device 140 and, in response to the RRC connection setup message, provides an initial message to another MME 105. After step 430, the flowchart 400 ends.

In operation, the base station 120.1 can be configured to select another MME from the remaining MMEs of the pool of MMEs 105.2 to 105.N based on the TAU request included in the received RRC connection setup complete message. For example, the base station 120.1 can be configured to select the other MME based on load balancing TAU requirements defined in the TAU request. Following selection, the base station 120.1 forwards an initial UE message (e.g., INITIAL UE MESSAGE (TAU)) to the selected MME from the pool of remaining MMEs 105.2 to 105.N.

Figure 5:
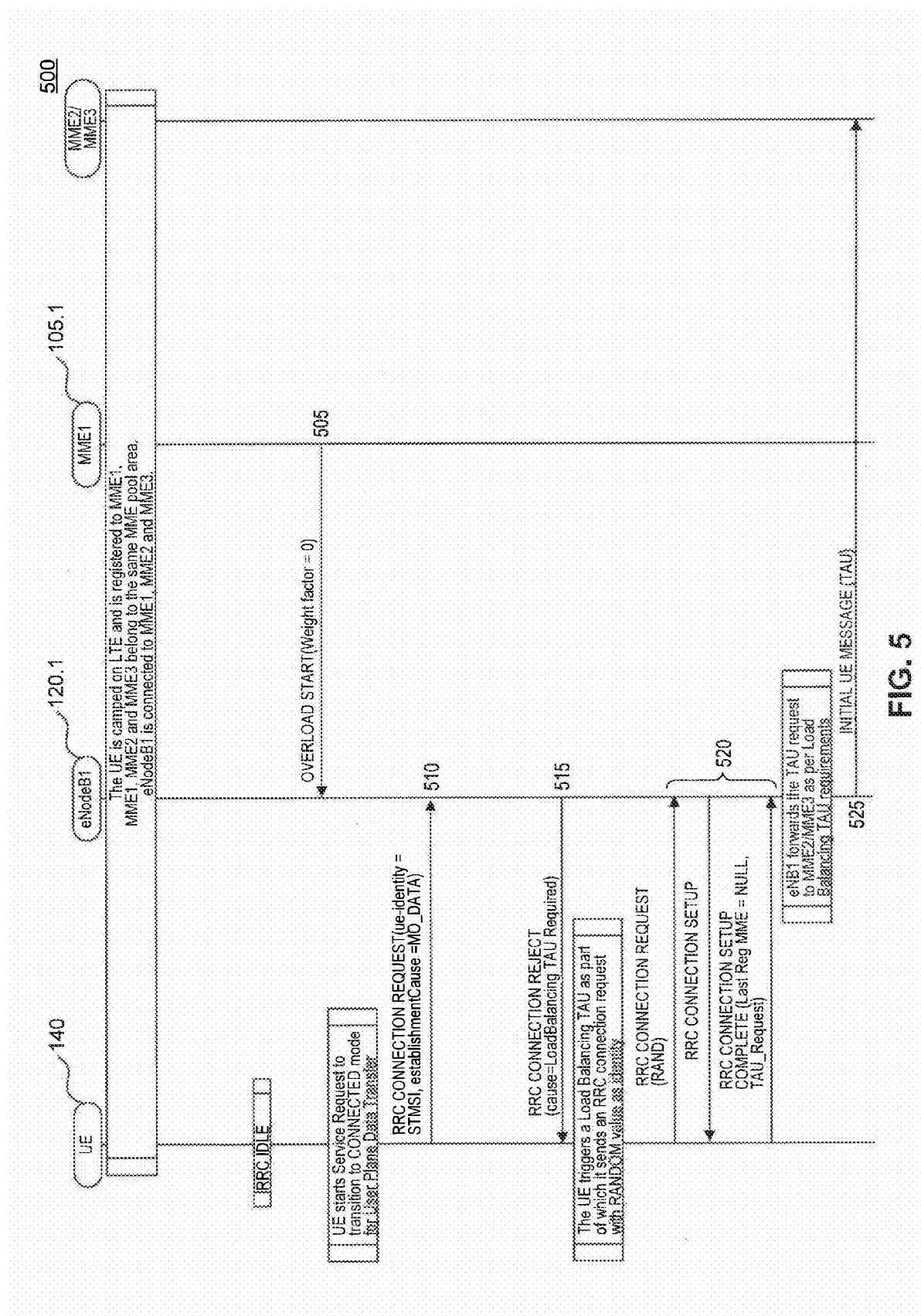
FIG. 5 illustrates a flowchart of a load balancing procedure according to an exemplary embodiment of the present disclosure.

FIG. 5 illustrates a flowchart 500 of a load balancing method in accordance with an exemplary embodiment of the present disclosure. The method of flowchart 500 is described with continued reference to one or more of FIGS. 1-4. The steps of the method of flowchart 500 are not limited to the order described below, and the various steps may be performed in a different order. Further, two or more steps of the method of flowchart 500 may be performed simultaneously with each other.

The method of flowchart 500 has similar starting assumptions to that of flowchart 400 and begins at step 505, where MME 105.1 of the pool of MMEs 105.1 to 105.N generates an overload start message and provides the overload start message to one or more of the base stations 120. For example, the MME 105.1 can send the message to each of the base stations 120. For the purposes of this discussion, the flowchart 500 will be described with reference to the base station's 120.1 receipt of the overload start message and the mobile device's 140 registration with MME 105.1.

In an exemplary embodiment, the MME 105.1 issues the overload start message in response to a request from, for example, a service provider associated with the MME 105.1 indicating that the MME 105.1 is to be shut down for maintenance, overloading, and/or any other reason as would be understood by those skilled in the relevant arts. The overload start message can be provided to each of the base stations 120 that are associated with the MME 105.1. In an exemplary embodiment, the overload start message includes a weight factor having a value of, for example, zero. In operation, the mobile devices 140 register with an MME from a pool of MMEs based on the weight factor. With a weight factor of zero, mobile devices 140 will not register with the MME 105.1.

After step 505, the method of flowchart 500 transitions to step 510, where the mobile device 140 transitions from an idle mode to a connected mode. In operation, the mobile device 140 generates a radio resource control (RRC) connection request and provides the RRC connection request to the base station 120.1. The RRC connection request includes an SAE temporary mobile subscriber identity (STMSI) and an establishment cause. The STMSI includes information used by the base station 120.1 to identify that the mobile device 140 is registered with MME 105.1.

After step 510, the method of flowchart 500 transitions to step 515, where the base station 120.1 generates an RRC Connection Reject message that includes a load balancing clause (e.g., "LoadBalancing TAU Required" clause). The base station 120.1 is configured to provide the generated RRC Connection Reject message to mobile device 140 in response to the received RRC connection Request from the mobile device 140. In these examples, the load balancing clause instructs the mobile device 140 to perform a load balancing procedure. In these examples, the base station 120.1 is aware of the MME's 105.1 unavailability due to the previously received overload start message received from MME 105.1.

In operation, the base station 120.1 is configured to provide the RRC Connection Reject message including the load balancing clause to mobile device 140 instead of generating and providing an RRC Connection Setup message to the mobile device 140. That is, because the base station 120.1 has previously received the overload start message from the MME 105.1, the base station 120.1 is aware that the MME 105.1 is shut down (or is to be shut down) and will not be accepting connections from registered mobile devices 140. More specifically, rather than completing the RRC connection setup (see, step 410 of FIG. 4), and forwarding the service request to the MME 105.1 and receiving a UE Context Release command from the MME 105.1 that indicates a load balancing TAU is required (see, step 415 of FIG. 4), the base station 120.1 informs the mobile device 140 that the MME 105.1 is unavailable and that a load balancing procedure should be performed without contacting the MME 105.1.

After step 515, the method of flowchart 500 transitions to step 520, where the mobile device 140 initiates transition from the idle mode to the connected mode by performing a load balancing procedure. In exemplary embodiments, the load balancing procedure is performed in response to the RRC Connection Reject message that includes the load balancing clause and is received from the base station 120.1.

In operation, the mobile device 140 generates an RRC connection request and provides the RRC connection request to the base station 120.1. Here, the RRC connection request includes a random number as an identifier. In an exemplary embodiment, the random number is a value from, for example, zero to $2^{40}$. In response to the RRC connection request, the base station 120.1 generates and provides an RRC connection setup message to the mobile device 140. The RRC connection setup message informs the mobile device 140 that it now has an active connection and the mobile device 140 is operating in a connected mode. The mobile device 140 is configured to generate and provide an RRC connection setup complete message to the base station 120.1 to acknowledge the RRC connection setup message. Here, the RRC connection setup complete message includes a null value for the last registered MME (e.g., Last Reg MME=null) and a Tracking Area Update (TAU) request (e.g., TAU_Request).

After step 520, the method of flowchart 500 transitions to step 525, where the base station 120.1 receives the RRC connection setup complete message from the mobile device 140 and, in response to the RRC connection setup message, provides an initial message to another MME 105. After step 525, the flowchart 500 ends.

In an exemplary embodiment, the base station 120.1 is configured to select another MME from the remaining MMEs of the pool of MMEs 105.2 to 105.N based on the TAU request included in the received RRC connection setup complete message. For example, the base station 120.1 can be configured to select the other MME based on load balancing TAU requirements defined in the TAU request. Following selection, the base station 120.1 forwards an initial UE message (e.g., INITIAL US MESSAGE (TAU)) to the selected MME from the pool of remaining MMEs 105.2 to 105.N.

FIG. 6 illustrates a flowchart 600 of a conventional load balancing method. The method of flowchart 600 is described with continued reference to one or more of FIGS. 1-5. The steps of the method of flowchart 600 are not limited to the order described below, and the various steps may be performed in a different order. Further, two or more steps of the method of flowchart 600 may be performed simultaneously with each other.

The method of flowchart 600 has similar starting assumptions to that of flowchart 400 and begins at step 605, where MME 105.1 of the pool of MMEs 105.1 to 105.N generates an overload start message and provides the overload start message to one or more of the base stations 120. For example, the MME 105.1 can send the message to each of the base stations 120. For the purposes of this discussion, the flowchart 600 will be described with reference to the base station's 120.1 receipt of the overload start message and the mobile device's 140 registration with MME 105.1.

In operation, the MME 105.1 issues the overload start message in response to the MME 105.1 becoming overloaded. In operation, the MME 105.1 can be configured to issue an overload start message to one or more base stations 120 connected to the MME 105.1. In this example, the overload start message is provided to the base station 120.1.

The overload start message can include a weight factor and one or more types of RRC Connection requests that are to be blocked by the base station 120.1. For example, the weight factor can be 0.5, and the overload start message can define that non-emergency requests be blocked. That is, the overload start message can be used to reduce the load of the MME 105.1 by restricting the types of requests the MME will accept (e.g., only emergency calls) and adjusting the weight factor to reduce the registrations to the MME 105.1. The overload start message can be provided to each of the base stations 120 that are associated with the MME 105.1.

After step 605, the method of flowchart 600 transitions to step 610, where the mobile device 140 attempts to transition from an idle state to a connected state. In operation, the mobile device 140 generates a radio resource control (RRC) connection request and provides the RRC connection request to the base station 120.1. The RRC connection request includes an SAE temporary mobile subscriber identity (STMSI) and an establishment cause. The STMSI includes information used by the base station 120.1 to identify that the mobile device 140 is registered with MME 105.1.

In response to the received RRC connection request from the mobile device 140, the base station 120.1 can generate and provide an RRC Connection Reject message to the mobile device 140. In operation, the base station 120.1 is aware that the MME 105.1 registered to the mobile device 140 is only accepting connections for emergency request based on the previously received overload start message. Because the RRC connection request is for non-emergency communications, the base station 120.1 is configured to issue the RRC Connection Reject message to reject the mobile device's 140 attempt to enter the connected state and connect to the MME 105.1.

The RRC Connection Reject message can include a wait time duration (e.g., waitTime). In operation, the mobile device 140 is configured to wait the amount of time set forth in the wait time duration before attempting another attempted transition to the connected state (e.g., before issuing another RRC connection request message).

After step 610, the method of flowchart 600 transitions to step 615, where the mobile device is configured to attempt another transition to the connected state following the expiration of the wait time duration set forth in the RRC Connection Reject message. In operation, the mobile device 140 is configured to generate and provide an RRC connection request message to the base station 120.1 in another attempt to transition to the connected state. In these examples, the mobile device 140 can be configured to attempt an RRC connection request procedure a predetermined number of times.

In operation, the MME 105.1 can rescind the overload operations by generating and providing an overload end message to one or more of the base stations 120. If the base station 120.1 has not received an overload end message from the MME 105.1 before subsequent RRC connection request message is received from the mobile device 140, the base station 1.20.1 is configured to issue another RRC Connection Reject message indicating another wait time duration. If the overload operations have been received before the expiration of a previous wait time duration, the base station 120 is configured to issue an RRC connection setup in response to a subsequent RRC connection request message.

In these examples, the overload start message can define a duration in which the overload operations are to remain active. In this example, the base stations 120 can be configured to issue RRC Connection Reject messages until the overload operations have been deactivated (e.g., until the defined duration has expired).

After step 615, the method of flowchart 600 ends or step 615 can be repeated.

In operation, where the RRC connection request from the mobile device 140 is for an emergency call, the base station 120 and the MME 105 can be configured to allow the connection from the mobile device 140. For example, the base station 120 can be configured transmit an RRC connection setup message to the mobile device 140, which can acknowledge receipt of the RRC connection setup message with an RRC connection setup complete message. Further, the base station 120 can be configured to forward a service request clause within the RRC connection setup complete message to the MME 105.1 to establish the emergency call.

Figure 7:
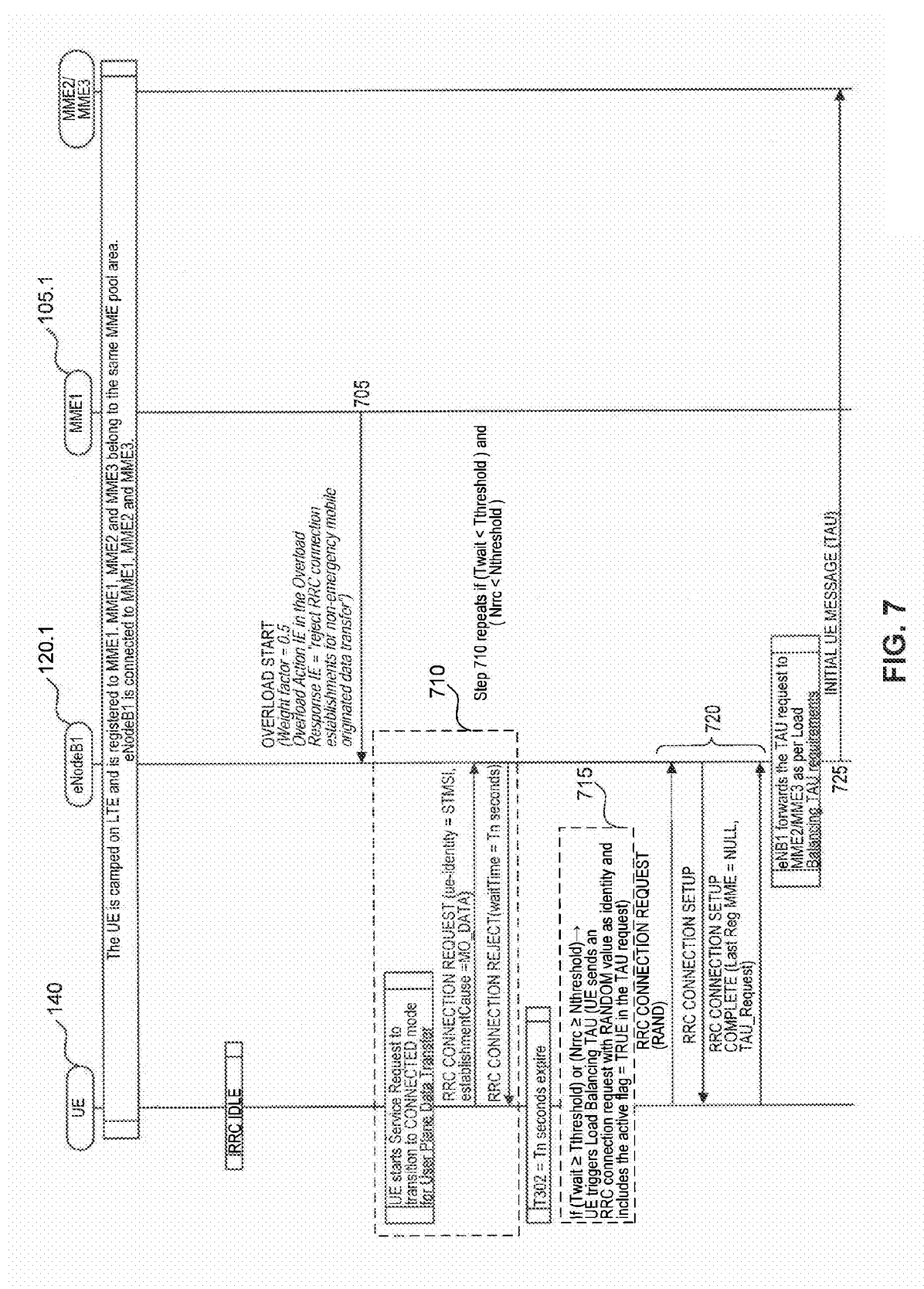
FIG. 7 illustrates a flowchart of a load balancing procedure according to an exemplary embodiment of the present disclosure.

FIG. 7 illustrates a flowchart 700 of a load balancing method in accordance with an exemplary embodiment of the present disclosure. The method of flowchart 700 is described with continued reference to one or more of FIGS. 1-6. The steps of the method of flowchart 700 are not limited to the order described below, and the various steps may be performed in a different order. Further, two or more steps of the method of flowchart 700 may be performed simultaneously with each other.

The method of flowchart 700 has similar starting assumptions to that of flowchart 400 and begins at step 705, where MME 105.1 of the pool of MMEs 105.1 to 105.N generates an overload start message and provides the overload start message to one or more of the base stations 120. For example, the MME 105.1 can send the message to each of the base stations 120. For the purposes of this discussion, the flowchart 700 will be described with reference to the base station's 120.1 receipt of the overload start message and the mobile device's 140 registration with MME 105.1.

In an exemplary embodiment, the MME 105.1 issues the overload start message in response to the MME 105.1 becoming overloaded. In operation, the MME 105.1 can be configured to issue an overload start message to one or more base stations 120 connected to the MME 105.1. In this example, the overload start message is provided to the base station 120.1.

In an exemplary embodiment, the overload start message includes a weight factor and one or more types of RRC Connection requests that are to be blocked by the base station 120.1. For example, the weight factor can be 0.5, and the overload start message can define that non-emergency requests be blocked. That is, the overload start message can be used to reduce the load of the MME 105.1 by restricting the types of requests the MME will accept (e.g., only emergency calls) and adjusting the weight factor to reduce the registrations to the MME 105.1. The overload start message can be provided to each of the base stations 120 that are associated with the MME 105.1.

After step 705, the method of flowchart 700 transitions to step 710, where the mobile device attempts to transition from an idle state to a connected state. In an exemplary embodiment, the mobile device 140 generates a radio resource control (RRC) connection request and provides the RRC connection request to the base station 120.1. The RRC connection request includes an SAE temporary mobile subscriber identity (STMSI) and an establishment cause. The STMSI includes information used by the base station 120.1 to identify that the mobile device 140 is registered with MME 105.1.

In response to the received RRC connection request from the mobile device 140, the base station 120.1 can generate and provide an RRC Connection Reject message to the mobile device 140. In operation, the base station 120.1 is aware that the MME 105.1 registered to the mobile device 140 is only accepting connections for emergency request based on the previously received overload start message. Because the RRC connection request is for non-emergency communications, the base station 120.1 is configured to issue the RRC Connection Reject message to reject the mobile device's 140 attempt to enter the connected state and connect to the MME 105.1.

In an exemplary embodiment, the RRC Connection Reject message includes a wait time duration (e.g., waitTime). In operation, the mobile device 140 is configured to wait the amount of time set forth in the wait time duration before attempting another transition to the connected state (e.g., before issuing another RRC connection request message).

In an exemplary embodiment, where the RRC connection request from the mobile device 140 is for an emergency call, the base station 120 and the MME 105 can be configured to allow the connection from the mobile device 140. For example, the base station 120 can be configured transmit an RRC connection setup message to the mobile device 140, which can acknowledge receipt of the RRC connection setup message with an RRC connection setup complete message. Further, the base station 120 can be configured to forward a service request clause within the RRC connection setup complete message to the MME 105.1 to establish the emergency call.

After step 710, the method of flowchart 700 transitions to step 715, where the mobile device 140 is configured to determine whether to repeat the RRC connection request procedure as described in step 710, or to perform a load balancing procedure.

In an exemplary embodiment, the mobile device 140 is configured to compare a wait time duration to a wait time threshold and/or compare a number of RRC Connection Reject messages that have been received by the mobile device 140 to an RRC Connection Rejection threshold. In these examples, the wait time duration is the total time that has elapsed since the initial RRC connection request issued by the mobile device 140. The wait time threshold is a predetermined time duration. The number of RRC Connection Reject messages is the number of RRC Connection Reject messages that have been received by the mobile device 140 in response to previous RRC connection request messages issued by the mobile device 140. The RRC Connection Rejection threshold is a predetermined number of RRC Connection Reject messages. In an exemplary embodiment, the wait time threshold and/or the RRC Connection Rejection threshold are determined by the mobile device 140. It should also be appreciated that the wait time threshold and/or the RRC Connection Rejection threshold can be determined by, for example, one or more base stations 120, one or more MMEs 105, one or more service providers, and/or one or more other components of the core network, and then provided a priori to the mobile device 140.

In operation, the mobile device 140 is configured to determine whether to perform another RRC connection request procedure as described in step 710 or perform load balancing procedure as described below in step 720. In an exemplary embodiment, the mobile device 140 is configured to perform a load balancing procedure when one or both of the following equations are satisfied:

$$T_{wait} \geq T_{threshold}$$

or $$N_{RRC} \geq N_{threshold}$$

Where $T_{wait}$ is the wait time duration, $T_{hreshold}$ is the wait time threshold, $N_{RRC}$ is the number of RRC Connection Reject messages that have been received by the mobile device 140, and $N_{threshold}$ is the RRC Connection Rejection threshold.

If neither of the above equations is satisfied, the method of flowchart 700 repeats step 715. Otherwise (if one or more of the equations is satisfied), the method of flowchart 700 transitions to step 720.

At step 720, the mobile device 140 is configured to perform a load balancing procedure. In operation, the mobile device 140 generates an RRC connection request and provides the RRC connection request to the base station 120.1. Here, the RRC connection request includes a random number as an identifier. In response to the RRC connection request, the base station 120.1 generates and provides an RRC connection setup message to the mobile device 140. The RRC connection setup message informs the mobile device 140 that it now has an active connection and the mobile device 140 is operating in a connected mode. The mobile device 140 is configured to generate and provide an RRC connection setup complete message to the base station 120.1 to acknowledge the RRC connection setup message. Here, the RRC connection setup complete message includes a null value for the last registered MME (e.g., Last Reg MME=null) and a Tracking Area Update (TAU) request (e.g., TAU_Request).

After step 720, the method of flowchart 700 transitions to step 725, where the base station 120.1 receives the RRC connection setup complete message from the mobile device 140 and, in response to the RRC connection setup message, provides an initial message to another MME 105. After step 725, the flowchart 700 ends.

In an exemplary embodiment, the base station 120.1 is configured to select another MME from the remaining MMEs of the pool of MMEs 105.2 to 105.N based on the TAU request included in the received RRC connection setup complete message. For example, the base station 120.1 can be configured to select the other MME based on load balancing TAU requirements defined in the TAU request. Following selection, the base station 120.1 forwards an initial UE message (e.g., INITIAL US MESSAGE (TAU)) to the selected MME from the pool of remaining MMEs 105.2 to 105.N.

Figure 8:
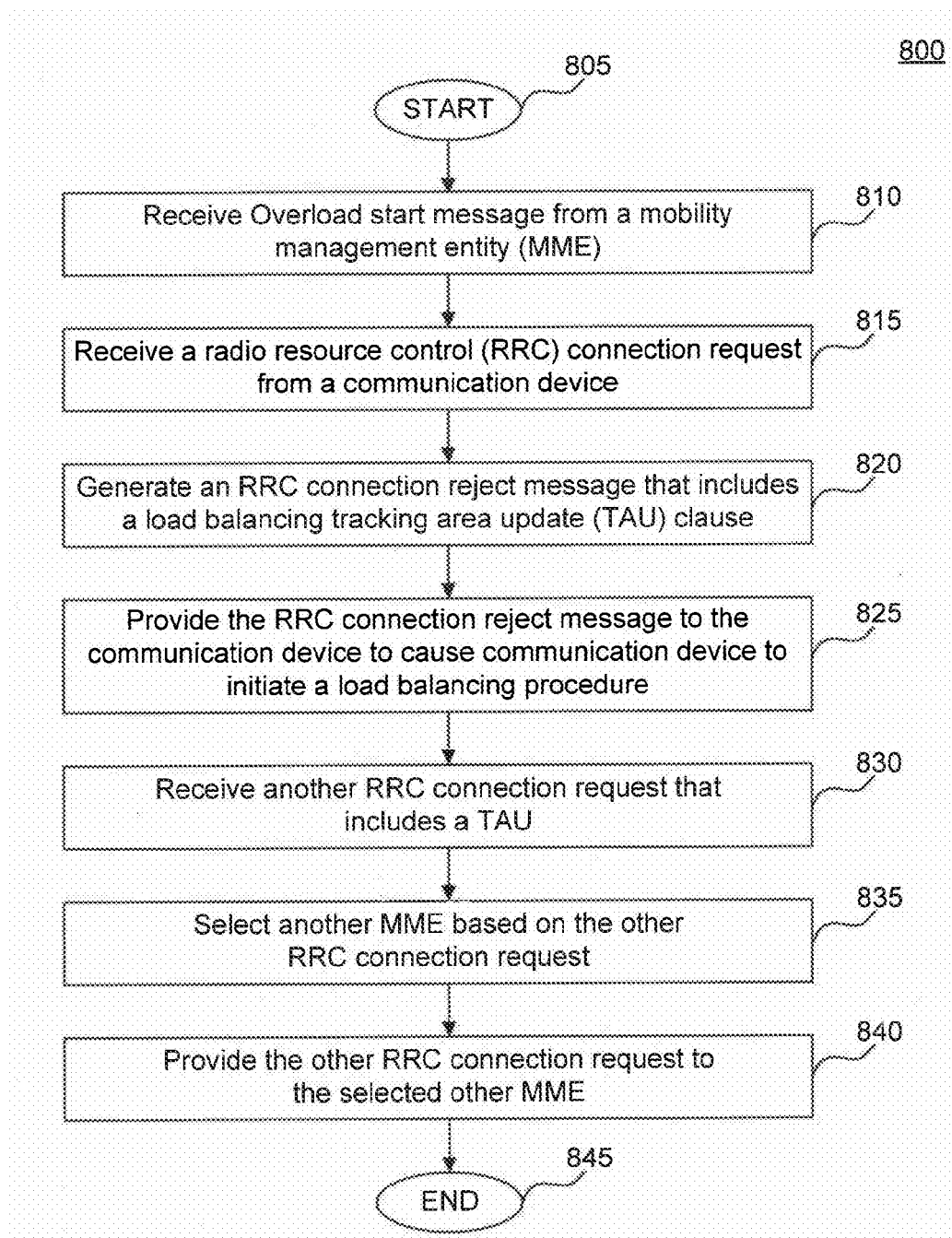
FIG. 8 illustrates a flowchart of a load balancing procedure according to an exemplary embodiment of the present disclosure.

FIG. 8 illustrates a flowchart 800 of a load balancing method in accordance with an exemplary embodiment of the present disclosure. The method of flowchart 800 is described with continued reference to one or more of FIGS. 1-7. The steps of the method of flowchart 800 are not limited to the order described below, and the various steps may be performed in a different order. Further, two or more steps of the method of flowchart 800 may be performed simultaneously with each other.

The method of flowchart 800 has similar starting assumptions to that of flowchart 400 and begins at step 805 and transitions to step 810, where a base station 120 receives an overload start message from a mobility management entity (MME).

In an exemplary embodiment, MME 105.1 of the pool of MMEs 105.1 to 105.N generates an overload start message and provides the overload start message to one or more of the base stations 120. For example, the MME 105.1 can send the message to each of the base stations 120. For the purposes of this discussion, the flowchart 800 will be described with reference to the base station's 120.1 receipt of the overload start message and the mobile device's 140 registration with MME 105.1. In an exemplary embodiment, the MME 105.1 issues the overload start message in response to a request from, for example, a service provider associated with the MME 105.1 indicating that the MME 105.1 is to be shut down. The overload start message can be provided to each of the base stations 120 that are associated with the MME 105.1. The overload start message can include a weight factor having a value of for example, zero.

After step 810, the method of flowchart 800 transitions to step 815, where the base station 120 receives a radio resource control (RRC) connection request from the mobile device 140.

In an exemplary embodiment, the mobile device 140 generates a radio resource control (RRC) connection request and provides the RRC connection request to the base station 120.1. The RRC connection request includes an SAE temporary mobile subscriber identity (STMSI) and an establishment cause. The STMSI includes information used by the base station 120.1 to identify that the mobile device 140 is registered with MME 105.1.

After step 815, the method of flowchart 800 transitions to step 820, where the base station 120 generates an RRC Connection Reject message that includes a load balancing tracking area update (TAU) clause.

In an exemplary embodiment, the base station 120.1 generates an RRC
Connection Reject message that includes a load balancing clause (e.g., "LoadBalancing TAU Required" clause).

After step 820, the method of flowchart 800 transitions to step 825, where the base station 120 provides the RRC Connection Reject message that includes the load balancing TAU clause to mobile device 140 to initiate a load balancing procedure by the mobile device.

The base station 120.1 is configured to provide the generated RRC Connection Reject message to mobile device 140 in response to the received RRC connection Request from the mobile device 140. In these examples, the load balancing clause instructs the mobile device 140 to perform a load balancing procedure. The base station 120.1 is aware of the MME's 105.1 unavailability due to the previously received overload start message received from MME 105.1.

In operation, the base station 120.1 is configured to provide the RRC Connection Reject message including the load balancing clause to mobile device 140 instead of generating and providing an RRC Connection Setup message to the mobile device 140. That is, because the base station 120.1 has previously received the overload start message from the MME 105.1, the base station 120.1 is aware that the MME 105.1 is shut down (or is to be shut down) and will not be accepting connections from registered mobile devices 140. More specifically, rather than completing the RRC connection setup (see, step 410 of FIG. 4), and forwarding the service request to the MME 105.1 and receiving a UE Context Release command from the MME 105.1 that indicates a load balancing TAU is required (see, step 415 of FIG. 4), the base station 120.1 informs the mobile device 140 that the MME 105.1 is unavailable and that a load balancing procedure should be performed without contacting the MME 105.1.

After step 825, the method of flowchart 800 transitions to step 830, where the base station 120 receives another RRC connection request from the mobile device 140.

In an exemplary embodiment, the mobile device 140 generates an RRC connection request and provides the RRC connection request to the base station 120.1. In this example, the RRC connection request includes a random number as an identifier. In response to the RRC connection request, the base station 120.1 generates and provides an RRC connection setup message to the mobile device 140. The RRC connection setup message informs the mobile device 140 that it now has an active connection and the mobile device 140 is operating in a connected mode. The mobile device 140 is configured to generate and provide an RRC connection setup complete message to the base station 120.1 to acknowledge the RRC connection setup message. The RRC connection setup complete message can include a null value for the last registered MME (e.g., Last Reg MME=null) and a Tracking Area Update (TAU) request (e.g., TAU_Request).

After step 830, the method of flowchart 800 transitions to step 835, where the base station 120 selects another MME based on the other RRC connection request received from the mobile device 140.

In an exemplary embodiment, the base station 120.1 is configured to select another MME from the remaining MMEs of the pool of MMEs 105.2 to 105.N based on the TAU request included in the received RRC connection setup complete message. For example, the base station 120.1 can be configured to select the other MME based on load balancing TAU requirements defined in the TAU request.

After step 835, the method of flowchart 800 transitions to step 840, where the base station 120 provides the other RRC connection request to the selected MME 105.

In an exemplary embodiment, the base station 120.1 forwards an initial UE message (e.g., INITIAL US MESSAGE (TAU)) to the selected MME from the pool of remaining MMEs 105.2 to 105.N.

After step 840, the method of flowchart 800 transitions to step 845, where the method of flowchart 800 ends.

Figure 9:
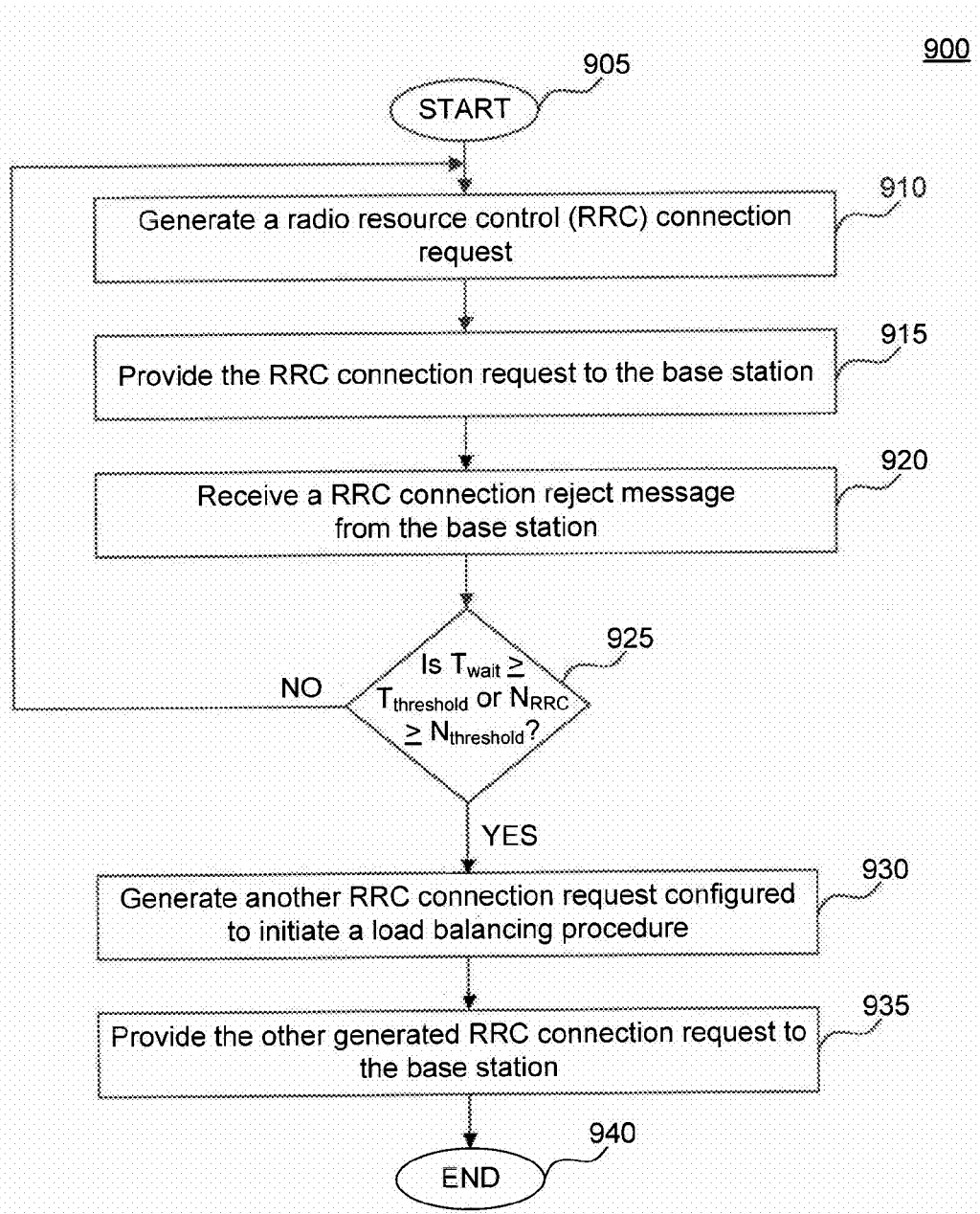
FIG. 9 illustrates a flowchart of a load balancing procedure according to an exemplary embodiment of the present disclosure.

FIG. 9 illustrates a flowchart 900 of a load balancing method in accordance with an exemplary embodiment of the present disclosure. The method of flowchart 900 is described with continued reference to one or more of FIGS. 1-8. The steps of the method of flowchart 900 are not limited to the order described below, and the various steps may be performed in a different order. Further, two or more steps of the method of flowchart 900 may be performed simultaneously with each other.

The method of flowchart 900 begins at step 905 and transitions to step 910, where mobile device 140 generates a radio resource control (RRC) connection request.

In an exemplary embodiment, the MME 105.1 of the pool of MMEs 105.1 to 105.N generates an overload start message and provides the overload start message to base station 120.1. The overload start message can be used to reduce the load of the MME 105.1 by restricting the types of requests the MME will accept (e.g., only emergency calls) and adjusting the weight factor to reduce the registrations to the MME 105.1.

In an exemplary embodiment, the mobile device 140 generates a radio resource control (RRC) connection request at some time following the base station's 120.1 receipt of the overload start message. The RRC connection request can include an SAE temporary mobile subscriber identity (STMSI) and an establishment cause. The STMSI includes information used by the base station 120.1 to identify that the mobile device 140 is registered with MME 105.1.

After step 910, the method of flowchart 900 transitions to step 915, where the mobile device 140 provides the RRC connection request to the base station 120.

In an exemplary embodiment, the mobile device 140 provides the generated RRC connection request to the base station 120.1.

After step 915, the method of flowchart 900 transitions to step 920, where the mobile device 140 receives an RRC Connection Reject message from the base station 120.

In an exemplary embodiment, and in response to the received RRC connection request from the mobile device 140, the base station 120.1 is configured to generate and provide an RRC Connection Reject message to the mobile device 140. In operation, the base station 120.1 is aware that the MME 105.1, to which the mobile device 140 is registered, is only accepting connections for emergency request, based on the previously received overload start message. Because the RRC connection request is for non-emergency communications, the base station 120.1 is configured to issue the RRC Connection Reject message to reject the mobile device's 140 attempt to enter the connected state and connect to the MME 105.1. The RRC Connection Reject message can include a wait time duration (e.g., waitTime). In operation, the mobile device 140 is configured to wait the amount of time set forth in the wait time duration before attempting another transition to the connected state (e.g., before issuing another RRC connection request message).

After step 920, the method of flowchart 900 transitions to step 925, where the mobile device determines whether to perform a load balancing procedure or to attempt another RRC connection request as described in step 910.

In operation, the mobile device 140 is configured to compare a wait time duration to a wait time threshold and/or compare a number of RRC Connection Reject messages that have been received by the mobile device 140 to an RRC Connection Rejection threshold. In these examples, the wait time duration is the total time that has elapsed since the initial RRC connection request issued by the mobile device 140. The wait time threshold is a predetermined maximum time duration. The number of RRC Connection Reject messages is the number of RRC Connection Reject messages that have been received by the mobile device 140 in response to previous RRC connection request messages issued by the mobile device 140. The RRC Connection Rejection threshold is a predetermined maximum number of RRC Connection Reject messages that have been received by the mobile device 140 in response to previous RRC connection request messages.

In an exemplary embodiment, the mobile device 140 is configured to determine whether to perform another RRC connection request procedure as described in step 910 or to perform a load balancing procedure as described below in steps 930 and 935. The mobile device 140 can be configured to determine if $$T_{wait} \geq T_{threshold}$$

or $$N_{RRC} \geq N_{threshold}$$

Where $T_{wait}$ is the wait time duration, $T_{threshold}$ is the wait time threshold, $N_{RRC}$ is the number of RRC Connection Reject messages that have been received by the mobile device 140, and $N_{threshold}$ is the RRC Connection Rejection threshold.

If $T_{wait} \geq T_{threshold}$ or $N_{RRC} \geq N_{threshold}$ (YES at step 925), the method of flowchart 900 transitions to step 930. Otherwise (NO at step 925), the method of flowchart 900 returns to step 910. In exemplary embodiments, step 910 can be repeated after the wait time set forth in the RRC connection Reject message (step 920) has expired.

At step 930, the mobile device 140 generates an RRC connection request that is configured to initiate a load balancing procedure.

In an exemplary embodiment, the mobile device 140 is configured to perform a load balancing procedure if one or both of the equations in step 925 are satisfied. In operation, the mobile device 140 generates an RRC connection request that includes a random number as an identifier.

After step 930, the method of flowchart 900 transitions to step 935, where the mobile device 140 provides the RRC connection request to the base station 120.

In operation, the mobile device 140 provides the RRC connection request to the base station 120.1. In response to the RRC connection request, the base station 120.1 generates and provides an RRC connection setup message to the mobile device 140. The RRC connection setup message informs the mobile device 140 that it now has an active connection and the mobile device 140 is operating in a connected mode. The mobile device 140 is configured to generate and provide an RRC connection setup complete message to the base station 120.1 to acknowledge the RRC connection setup message. Here, the RRC connection setup complete message includes a null value for the last registered MME (e.g., Last Reg MME=null) and a Tracking Area Update (TAU) request (e.g., TAU_Request).

In an exemplary embodiment, the base station 120.1 is configured to select another MME from the remaining MMEs of the pool of MMEs 105.2 to 105.N based on the TAU request included in the received RRC connection setup complete message. For example, the base station 120.1 can be configured to select the other MME based on load balancing TAU requirements defined in the TAU request. Following selection, the base station 120.1 forwards an initial UE message (e.g., INITIAL US MESSAGE (TAU)) to the selected MME from the pool of remaining MMEs 105.2 to 105.N.

After step 935, the method of flowchart 900 transitions to step 940, where the method of flowchart 900 ends.

Conclusion

The aforementioned description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

In embodiments having one or more components that include one or more processors, one or more of the processors can include (and/or be configured to access) one or more internal and/or external memories that store instructions and/or code that, when executed by the processor(s), cause the processor(s) to perform one or more functions and/or operations related to the operation of the corresponding component(s) as described herein and/or as would appreciated by those skilled in the relevant art(s).

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventors, and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

What is claimed is:

1. A communication device, comprising:
a transceiver configured to communicate with a communication network; and
processor circuitry communicatively coupled to the transceiver, the processor circuitry configured to:
send a connection request message to a base station,
receive a first connection reject message from the base station,
determine a wait time duration associated with the connection request message,
determine a number of connection reject messages, including the first connection rejection message, received by the communication device, and
send a message to the base station to initiate a load balancing procedure in response to determining that:
the number of connection reject messages is greater than or equal to a predetermined connection rejection threshold amount, or
the wait time duration is greater than or equal to a wait time threshold amount.

2. The communication device of claim 1, wherein the wait time duration indicates an elapsed time since the communication device attempted to connect to the base station.

3. The communication device of claim 2, wherein the message includes a random identifier to initiate the load balancing procedure.

4. The communication device of claim 1, wherein the message is configured to cause the base, station to initiate the load balancing procedure.

5. The communication device of claim 1, wherein the message includes a random number to identify a managing entity.

6. The communication device of claim 1, wherein the first connection reject message is a Radio Resource Control (RRC) connection reject message.

7. A communication device, comprising:
a transceiver; and
processor circuitry coupled to the transceiver, the processor circuitry configured to:
send a first message to a base station to attempt to connect to the base station, wherein the message identifies a first managing entity,
receive a connection reject message from the base station,
determine a wait time duration associated with the first message, and
send a second message to the base station in response to determining that:
a number of connection reject messages that the communication device received is greater than or equal to a predetermined connection rejection threshold amount, wherein the second message does not identify the first managing entity, or
the wait time duration is greater than or equal to a wait time threshold amount.

8. The communication device of claim 7, wherein the first message comprises information used by the base station to identify that the communication device is registered with the first managing entity.

9. The communication device of claim 7, wherein the second message includes a random number as a managing entity identifier that does not identify the first managing entity.

10. The communication device of claim 7, wherein the second message is configured to initiate a load balancing procedure that cause the base station to select a second managing entity that is different from the first managing entity.

11. The communication device of claim 7, wherein the second message is configured to cause the base station to initiate, a load balancing procedure.

12. The communication device of claim 11, wherein the second message includes a random number to identify a managing entity to cause the base station to initiate the load balancing procedure.

13. The communication device of claim 7, wherein the wait time duration indicates an elapsed time since the communication device attempted to connect to the base station.

14. The communication device of claim 7, wherein the connection reject message is a Radio Resource Control (RRC) connection reject message.

15. A communication device, comprising:
a transceiver; and
processor circuitry coupled to the transceiver, the processor circuitry configured to:
    send a first message to a base station to attempt to connect to the base station, wherein the first message identifies a managing entity,
    receive a connection reject message from the base station,
    determine a wait time duration associated with the first message, and
    send a second message to the base station in response to determining that:
        a number of connection reject messages that the communication device received is greater than or equal to a predetermined connection rejection threshold amount, or
        the wait time duration is greater than or equal to a wait time threshold amount.

16. The communication device of claim 15, wherein the first message comprises information used by the base station to identify that the communication device is registered with the managing entity.

17. The communication device of claim 15, wherein the second message includes a random number as a managing entity identifier.

18. The communication device of claim 15, wherein the second message is configured to cause the base station to initiate a load balancing procedure.

19. The communication device of claim 15, wherein the wait time duration indicates an elapsed time since the communication device attempted to connect to the base station.

20. The communication device of claim 15, wherein the connection reject message is a Radio Resource Control (RRC) connection reject message.

* * * * *

UNITED STATES PATENT AND TRADEMARK OFFICE
CERTIFICATE OF CORRECTION

PATENT NO. : 9,154,995 B2
APPLICATION NO. : 14/282889
DATED : October 6, 2015
INVENTOR(S) : Chimbili et al.

Page 1 of 1

It is certified that error appears in the above-identified patent and that said Letters Patent is hereby corrected as shown below:

In the Claims
In column 22, line 19, replace "base, station" with --base station--.
In column 22, line 56, replace "cause" with --causes--.
In column 22, line 60, replace "initiate, a" with --initiate a--.

Signed and Sealed this
Twenty-eighth Day of June, 2016

Michelle K. Lee
*Director of the United States Patent and Trademark Office*